US011180356B2

(12) United States Patent
Muszinski et al.

(10) Patent No.: US 11,180,356 B2
(45) Date of Patent: Nov. 23, 2021

(54) CONTAINER-FILLING ASSEMBLY

(71) Applicant: KHS GmbH, Dortmund (DE)

(72) Inventors: Olaf Muszinski, Kelkheim (DE); Hans-Jürgen Katzenbächer, Bad Kreuznach (DE)

(73) Assignee: KHS GmbH, Dortmund (DE)

(*) Notice: Subject to any disclaimer, the term of this patent is extended or adjusted under 35 U.S.C. 154(b) by 177 days.

(21) Appl. No.: 16/087,205

(22) PCT Filed: Feb. 1, 2017

(86) PCT No.: PCT/EP2017/052152
§ 371 (c)(1),
(2) Date: Sep. 21, 2018

(87) PCT Pub. No.: WO2017/162358
PCT Pub. Date: Sep. 28, 2017

(65) Prior Publication Data

US 2019/0100422 A1 Apr. 4, 2019

(30) Foreign Application Priority Data

Mar. 24, 2016 (DE) ..................... 10 2016 105 524.7

(51) Int. Cl.
*B67C 3/00* (2006.01)
*B67C 3/24* (2006.01)
(Continued)

(52) U.S. Cl.
CPC ................ *B67C 3/007* (2013.01); *B67B 3/26* (2013.01); *B67C 3/02* (2013.01); *B67C 3/24* (2013.01);
(Continued)

(58) Field of Classification Search
CPC .. B67C 3/007; B67C 3/27; B67C 3/26; B67C 3/02; B67C 3/28; B67B 3/26; B65B 3/00; B29C 49/78
(Continued)

(56) References Cited

U.S. PATENT DOCUMENTS 4,445,549 A 5/1984 Berhard
5,713,403 A * 2/1998 Clusserath ................ B65C 3/16 141/101
(Continued)

FOREIGN PATENT DOCUMENTS

CN 1509978 7/2004
CN 1923669 3/2007
(Continued)

OTHER PUBLICATIONS

Office Action, Chinese Application No. 201780019339.8, dated Jan. 6, 2020 (7 pages).

*Primary Examiner* — Mary E McManmon
*Assistant Examiner* — Stephanie A Shrieves
(74) *Attorney, Agent, or Firm* — Occhiuti & Rohlicek LLP

(57) ABSTRACT

In a filling machine, a circulation line connects a filling element to a filling tank at a location for drawing beverage from the filling tank and at a location for adding beverage to the filling tank. A controller connects to a measuring system that itself connects to either or both the filling tank and the circulation line. Based in part on measurements from the measuring system, the controller controls addition of beverage components at a dosage section along the circulation line.

20 Claims, 1 Drawing Sheet

(51) Int. Cl.

| | |
|---|---|
| ***B67B 3/26*** | (2006.01) |
| ***B67C 3/28*** | (2006.01) |
| ***B67C 3/02*** | (2006.01) |
| *B29C 49/78* | (2006.01) |
| *B67C 3/26* | (2006.01) |

(52) U.S. Cl.
CPC ................ *B67C 3/28* (2013.01); *B29C 49/78* (2013.01); *B67C 3/26* (2013.01)

(58) Field of Classification Search
USPC .......................................................... 141/105
See application file for complete search history.

(56) References Cited

U.S. PATENT DOCUMENTS

| | | | | | |
|---|---|---|---|---|---|
| 5,967,367 | A * | 10/1999 | Orsborn | B67D 1/0041 | 222/129.1 |
| 7,661,352 | B2 * | 2/2010 | Sher | B67D 1/0021 | 222/129.1 |
| 8,096,320 | B2 * | 1/2012 | Reitter | F16K 1/123 | 137/614.2 |
| 8,460,733 | B2 * | 6/2013 | Wu | B67C 3/02 | 426/521 |
| 8,528,607 | B2 * | 9/2013 | Wagner | B67C 3/02 | 141/94 |
| 2006/0286262 | A1 * | 12/2006 | Stearns | A47J 31/41 | 426/596 |
| 2012/0180902 | A1 * | 7/2012 | Neuhauser | B67C 3/208 | 141/9 |
| 2013/0126040 | A1 * | 5/2013 | Clusserath | B67C 3/10 | 141/65 |
| 2014/0238531 | A1 * | 8/2014 | Muszinski | B67C 3/28 | 141/1 |

FOREIGN PATENT DOCUMENTS

| | | | | |
|---|---|---|---|---|
| CN | 103771315 | | 5/2014 | |
| DE | 10 2007 058 047 | | 6/2009 | |
| DE | 10 2011 114690 | | 4/2013 | |
| DE | 102013106148 | A1 * | 12/2014 | A47J 31/60 |
| EP | 1496011 | A1 * | 1/2005 | B67D 1/0074 |
| EP | 1 719 419 | | 11/2006 | |
| WO | WO2009/068144 | | 6/2009 | |
| WO | WO2011/044972 | | 4/2011 | |

* cited by examiner

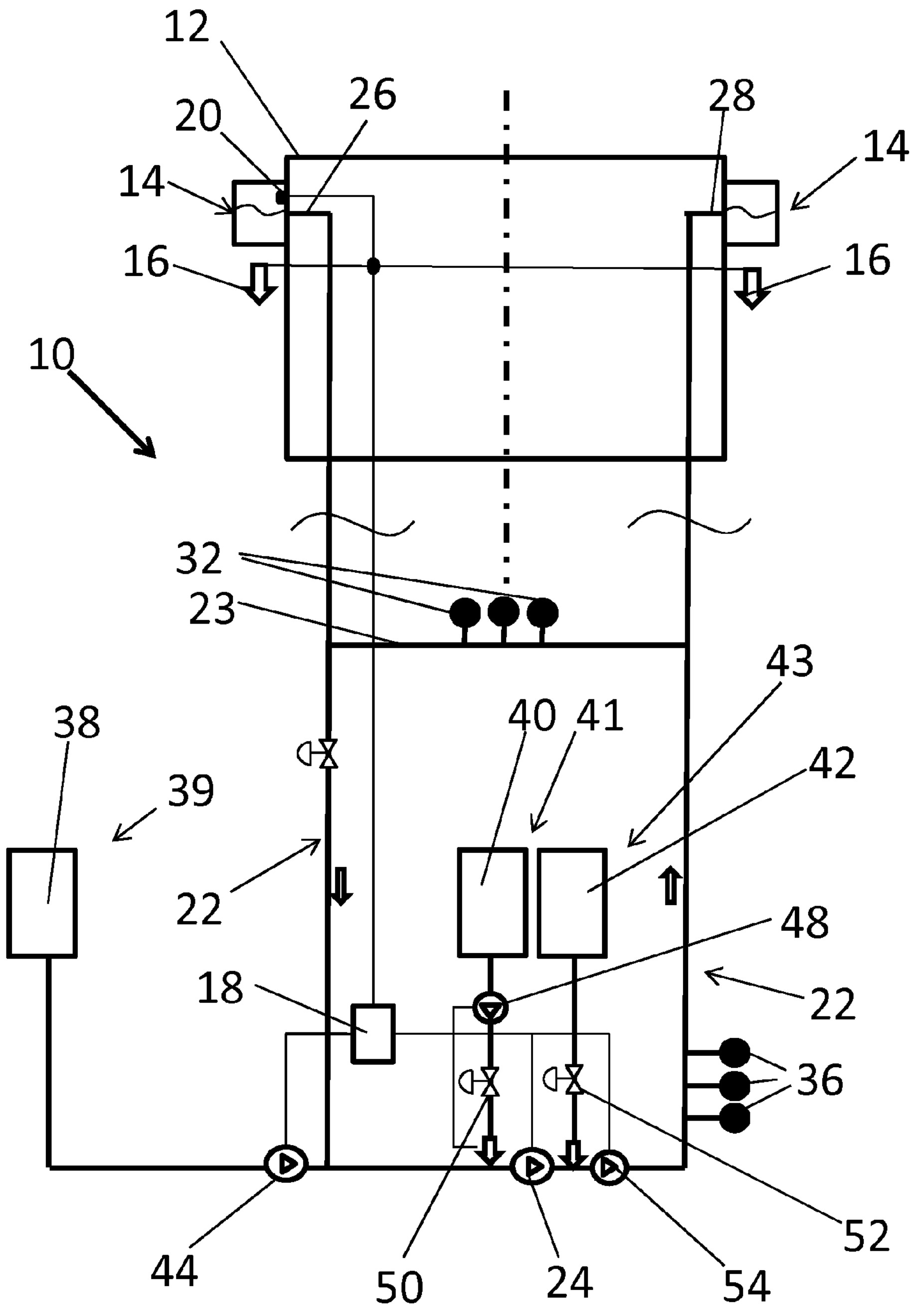
12
26
28
20
14
14
16
16
10
32
23
43
38
40
41
42
39
22
48
22
18
36
52
44
50
24
54

CONTAINER-FILLING ASSEMBLY

RELATED APPLICATIONS

This is the national stage of PCT/EP2017/052152, filed on Feb. 1, 2017, filed on Feb. 1, 2017, which claims the benefit of the Mar. 24, 2017 priority date of German application DE 10-2016-105-524.7, the contents of which are herein incorporated by reference.

FIELD OF INVENTION

The present invention relates mass production of beverages, and in particular, to filling machines.

BACKGROUND

A beverage has various ingredients that must be mixed together in the proper proportions. A typical container-filling assembly therefore includes, in addition to a filling machine, a separate mixer.

The mixer has its own buffer tank in which the beverage components were mixed together. After having been mixed together, the beverage is now ready to be fed into the filling tank.

A difficulty that arises is that the buffer tank has to be cleaned whenever the filling machine is to be used to fill a new beverage. This is a time-consuming operation.

SUMMARY

The invention concerns a container-filling assembly having a container-filling machine that is configured, for example, as a rotary filling machine and that has a number of filling elements for filling containers. A filling tank of the filling machine feeds multiple filling elements.

The container-filling assembly also has at least two beverage-components supplies that are connected to the filling tank of the container-filling machine. Examples include a water supply and a syrup supply. The container-filling assembly facilitates the filling of different beverages in a desired composition without a separate mixer having a buffer tank.

In one aspect of the invention, a container-filling machine's tank connects to a circulation line by which beverage is conveyed out of the filling tank and back into the filling tank. At least two beverage-component supplies lead into the circulation line, either directly or indirectly. Examples of beverage-component supplies include a water supply and a supply of a beverage base-material, such as syrup. The beverage component supplies and at least a part of the circulation line are preferably arranged separately from the container-filling machine.

The container-filling assembly also comprises a filling-machine controller that connects to at least one measuring sensor system that, in turn, connects to filling tank, the circulation line, or both the filling tank and the circulation line. The measuring sensor system provides a measurement signal.

The filling-machine controller controls the beverage component supplies as a function of an output signal of the measuring sensor system. In particular, the filling-machine controller causes beverage components to be added to the circulation line based on an analysis that includes consideration of the measurement signal.

An advantage of the apparatus arises from mixing beverage components in the circulation line where an intensive mixing of beverage components already takes place. This avoids having to have an external buffer tank. This also avoids the cost of a separate mixer with a buffer tank can also be saved and the extra space required to accommodate this extra equipment.

Furthermore, the measuring sensor system can also be conveniently arranged in the circulation line so that the composition of the beverage can be determined before and/or after the individual beverage components are supplied. It is optimal but not essential if at least one first measuring sensor system is arranged upstream of the beverage supplies or of the dosage section, and if preferably at least one second measuring sensor system is arranged downstream of the beverage component supplies, i.e. after the dosage section connected to the circulation line, because in this case the influence of the controller of the beverage supplies on the beverage composition can be determined. In this way the effects of the beverage supplies on the beverage can be continuously determined and used to control the beverage supply. As a result, specified mixing ratios of the components can be adhered to within very close limits, including at the start of production where a minor deviation of the composition from the desired value was to be expected due to residual water present in the beverage receptacles of the container-filling assembly. The circulation line can be routed via the filling tank, via the filling tank with the inclusion of the filling valves or leaving out the filling tank, with the first two solutions being preferred.

An apparatus as described herein permits beverage components in any desired composition to be supplied to a beverage without having to rely on a mixer with a separate buffer tank. This avoids the need to clean the buffer tank whenever the filling machine is to be used with a different beverage.

An additional disadvantage of using a separate buffer tank is the delay that arises before the mixed beverage actually reaches the filling tank. An apparatus as described herein significantly reduces this delay.

Another problem arises because the filling tank may have water residue from a previous purging operation, or it may have collected water simply from condensation. This means that even if the beverage is optimally mixed in the buffer tank, the mixture will no longer be optimal in the filling tank because it will have been diluted slightly by this extra water.

The apparatus described herein avoids this difficulty in part because any beverage in the filling tank will be provided to the measuring sensor system. As a result, the measuring sensor system continuously monitors the composition of the beverage in the filling tank. This makes it is possible to vary the amount of the various components to correct the problem in real time. For example, if the measuring sensor system detects that the filling tank contents are too dilute, it can reduce the amount of water added to the circulation line or increase the amount of syrup added to the circulation line.

The circulation line preferably contains a measuring circuit in which the first measuring sensor system is arranged, with the measuring circuit being provided to supply the measuring sensor system with a constant measured volumetric flow rate that is independent of the volumetric flow rate in the circulation line. This helps keep the measuring conditions constant. This measuring circuit can therefore be used to continuously monitor the composition of the beverage components and if necessary to readjust the composition to a desired value by way of an appropriate operating of the beverage component supplies.

In some embodiments, the circulation connects to a supply of carbon dioxide. In these embodiments, the filling-machine controller allows carbon dioxide to enter the circulation line in response to instructions from the filling-machine controller.

As a result, the circulation line supplies all the components that are necessary to make the beverage, for example the water, syrup, and carbon dioxide, to the filling tank and does in adaptively in response to instructions from the filling-machine controller that generates such instructions based on measurements provided by the measuring sensor system.

Some embodiments also include a pressure regulator or flow regulator in the circulation line downstream of where carbon dioxide enters the circulation line. The filling-machine controller controls the pressure regulator based at least in part on signals from the measuring sensor system.

In some embodiments, a measuring sensor system connects to the circulation line is upstream of the beverage component supply, or dosage section. This provides a way to obtain information about the composition of the beverage components in the filling tank.

In some embodiments, a measuring sensor system connects to the circulation line downstream of the dosage section. This measuring sensor system provides a way to measure the composition of the beverage just after having added additional beverage components at the dosage section.

Some embodiments have measuring sensor systems both upstream and downstream of the dosage section. This permits measurement of the composition both before and after dosing. This also provides a way to easily determine the rate of change of composition and thus promotes accurate dosing.

In some embodiments, a measuring sensor system has its own fluid circuit. This prevents the measuring sensor system from influencing the beverage flow in the circulation line and also facilitates a modular architecture in which the measuring sensor system can easily be closed off and replaced.

Some embodiments include a feed pump in the circulation line for feeding beverage through the circulation line. This feed pump can be controlled based on measurements from one or more measuring sensor systems. This permits optimal control over beverage flow in the circulation line and rapid adaptation thereof to support different operating states, such as states during which filling actually occurs and states in which containers are simply being moved.

Examples of sensors in a measuring system include an optical sensor that measures color of the blended beverage. Since color is a function of syrup concentration, it provides a basis for inferring syrup concentration. Another useful sensor is one that measures carbon dioxide composition. Yet another useful sensor is one that measures chemical composition. These sensors can be used individually or in combination to provide a basis for accurately regulating the composition of the beverage.

In some embodiments, one or more of the beverage component supplies features a regulator. Examples of a regulator include a regulated pump and a regulating valve. The regulator can then be controlled based at least in part on measurement signals from the measuring sensor system.

Some embodiments include a valve on a connecting line between the filling elements and the filling tank. Such a valve would be controlled as a function of an output signal of the measuring sensor system. As a result of such a valve, the filling elements receive beverage from the filling tank only when the filling tank is at a desired fill level and the composition of beverage in the filling tank is correct to within certain predefined limits.

In some embodiments, the container-filling machine is a rotary filling machine and the filling tank is an annular tank that extends around an outer periphery of the rotary filling machine and feeds the individual filling elements arranged on the outer periphery.

In some embodiments, a fill-level sensor within the filling tank connects the filling-machine controller. A signal from the fill-level signal indicates fill level in the tank and can thus be used for controlling the beverage supplies as well for controlling a valve between the filling tank and the filling elements.

In the same way the invention relates to a method for filling containers in a container-filling assembly implemented as described above, wherein, for a filling of the containers by way of the filling elements, the beverage components are supplied according to a given mixing ratio through the beverage component supplies to the circulation line without using a buffer tank. The mixing of the supplied beverage components takes place in the circulation line and/or in the filling tank of the filling machine. The beverage is then fed from the filling tank through the circulation line to a measuring sensor system which compares the composition of the beverage in the filling tank with a desired value.

A beverage composition which deviates from the desired value is then corrected by an appropriate actuating of the beverage component supply, and the further supplying of the beverage components, i.e. the operating of the beverage component supply, takes place under continuous evaluation of the ongoing beverage composition and appropriate individual operating of the beverage component supplies. The filling of the containers by the filling elements only takes place when the fill level in the filling tank has reached a minimum value and the beverage composition matches the desired value within permitted limits. In this way it is possible that a given composition of the beverage can be adhered to within very narrow limits from the beginning of filling of a container-filling assembly until the end of the filling operation, especially at the start of the filling operation where the beverage composition is often altered by residual water or condensation in lines or in spaces occupied by beverage in the container-filling assembly.

This method allows a filling of the containers by way of the container-filling assembly without the use of a mixer with its own buffer tank.

It is obvious to the skilled person that the embodiment of the invention described is combinable with one another in any desired manner.

BRIEF DESCRIPTION OF THE DRAWING

The invention is described in connection with FIG. 1, which shows a schematic side view of a rotary filling machine.

DETAILED DESCRIPTION

FIG. 1 shows a container-filling assembly 10 having a rotary filling-machine 12 with an external filling-tank 14 mounted thereon. The filling tank 14 feeds a filling element 16 from a plurality of filling elements that are arranged below the filling tank 14.

The filling tank 14 defines an annular space that surrounds the filling machine 12. A filling-machine controller 18 and a fill-level sensor 20 in the filling tank 14 cooperate to control the operation of the filling machine 12.

A bypass valve 17 connects the filling tank 14 or the filling element 16 to a circulation line 22 that is usually guided out of the filling machine 12. An output-level pump 24 arranged in the circulation line 22 delivers beverage from an inlet 26 to an outlet 28 of the circulation line 22, both of which lead into the filling tank 14. During operation, the output-level pump 24 regulates delivery rate.

Downstream of the inlet 22, a measuring circuit 23 branches off the circulation line 22. The measuring circuit 23 includes a first measuring-sensor system 32, a second measuring sensor system 36, and a measuring-circuit pump 25. The measuring-circuit pump 25 causes a constant volumetric-flow rate within the measuring circuit 23. The second measuring-sensor system 36 is arranged at the end of the circulation line 22 before its outlet 28.

Some embodiments feature a third measuring sensor system arranged in the circulation line 22 immediately upstream of the beverage supply, i.e. immediately upstream of the dosage section, in order to determine the beverage composition before the supply of beverage components.

As an alternative, or as an addition to the first measuring sensor system 32, some embodiments feature an optional fourth measuring sensor system that is connected to the filling tank 14 to determine the beverage composition in the filling tank.

Signal lines connect the first, second, third, and fourth measuring sensor systems to the filling-machine controller 18. In some embodiments, the filling-machine controller 18 includes a separate evaluation device for the evaluation of the first, second, third, and fourth measuring sensor systems. Other embodiments feature a further separate controller in addition to the filling-machine controller 18 for controlling beverage composition.

The circulation line 22 includes a dosage section, which is where it receives beverage components from various supplies of beverage components. In the illustrated example, the dosage section is where a water supply 39 introduces water, a syrup supply 41 introduces syrup, and a carbon-dioxide supply 43 introduces carbon dioxide. In the illustrated embodiment, the dosage section has the water supply 39, the syrup supply 41, and the carbon-dioxide supply 43 in a particular order. However, that order can be varied in different embodiments. In addition, not all these components are needed all the time. For example, a beverage that is not carbonated would have no need of the carbon-dioxide supply 43.

The water supply 39 includes a water vessel 38 and a water-supply pump 44 arranged in the circulation line 22 that pumps water from the water vessel 38 into the circulation line 22. In some embodiments, the water-supply pump 44 is a centrifugal pump. The water supply 39 connects to the circulation line 22 at a point that makes it the first supplier of material downstream of the measuring circuit 23 in the direction of flow.

The syrup supply 41 comprises a syrup container 40, a syrup supply pump 48, and a syrup regulating valve 50 that connects to the circulation line 22 and regulates flow of syrup into the circulation line 22. In some examples, the syrup supply 41 enters the circulation line 22 downstream of the water supply 39.

The carbon dioxide supply 43 includes a carbon-dioxide source 42 and a pressure-regulating valve 52 that regulates flow of carbon dioxide into the circulation line 22. The carbon dioxide supply connects to the circulation line 22 between the output-level pump 24 and a pressure regulating pump 54, with the pressure regulating pump 54 preferably also being controlled by the filling-machine controller 18.

The circulation line 22 also comprises an output regulating-valve 55 that preferably is also controlled by the filling-machine controller 18.

The filling-machine controller 18 controls all control and regulating devices, such as metering pumps, regulating valves, feed pumps, and pressure regulating valves are controlled by the filling-machine controller 18 as a function of the output signals of the measuring sensor systems and if applicable, the output signals of the fill level sensor 20.

Some embodiments omit one or more of the four measuring sensor systems and the fill level sensor 20. One preferred embodiment omits all but the second measuring sensor system 36 downstream of the dosage section.

The manner order in which the beverage components, the water supply 39, the syrup supply 41, and carbon-dioxide supply 43 into the circulation line 22, enter the circulation line 22 can be changed as well. It is also possible to arrange a valve and pump set, a valve set, or a pump set in one or more of the water supply 39, the syrup supply 41, and the carbon-dioxide supply 43. As used herein, a “set” can have more than one element. Thus, the pump set can have plural pumps, the valve set can have plural valves, and the valve and pump set can have plural pumps and valves.

The carbon-dioxide supply 4 is only necessary for carbonated beverages. The circulation line 22 with the associated beverage component supplies, the pumps, and the valves defines integrated mixing device of the container-filling assembly that dispenses with the need to have a buffer tank.

Operation begins with switching on the feed pump and adding the various beverage components to the circulation line 22 according to a given mixing ratio. This causes the fill level in the filling tank 14 to gradually rise.

During operation, the inlet 26 continuously draws beverage from the filling tank 14 and the outlet 29 continuously returns beverage to the filling tank 14. As a result, the composition of the beverage upstream of where the beverage components enter the circulation line 22 changes continuously. The third measuring sensor system continuously measures this composition.

Similarly, the composition of beverage downstream of where beverage components enter the circulation line 22 also changes continuously. The second measuring sensor system 36 continuously measures this composition. As a result, it is possible to obtain both up-to-date information obtained about the composition of the beverage composition in the filling tank 14 and also information about the change in beverage composition as a result of having added beverage components.

The first measuring sensor system 32 in the measuring circuit 23 indicates the composition of the beverage components in the filling tank 14. Alternatively, the optional fourth measuring sensor system in the filling tank 14 determines this composition. This makes it possible to set the composition of the beverage to a desired mixing ratio and a desired carbon dioxide content from the beginning while the current conditions inside the filling tank are continuously taken into consideration by circulating the beverage out of the filling tank 14. As a result, it is possible to achieve the desired beverage composition from the beginning of the filling operation and without the use of a separate mixer with a buffer tank.

A container-filling assembly described above is easy to clean and contains fewer components than previously known systems. This makes it efficient and more cost-effective. Furthermore it is possible more quickly to realize a desired composition of the beverage and to verify changes in the composition of the beverage by individually controlling the water supply 39, the syrup supply 41 and the carbon-dioxide supply 43.

The invention is not confined to the depicted embodiment but is capable of any variation within the protective scope of the following claims.

The invention claimed is:

1. An apparatus comprising a container-filling assembly, said container-filling assembly comprising a container-filling machine that comprises filling elements, a filling tank, a circulation line, a controller, and a measuring system, wherein said filling tank feeds beverage to said filling elements, wherein said circulation line connects to said filling tank at a location for drawing beverage from said filling tank and at a location for adding beverage to said filling tank, wherein beverage-component supplies lead into a dosage section of said circulation line, wherein said controller connects to said measuring system, wherein said measuring system is connected to at least one of said filling tank and said circulation line, wherein said controller controls addition of beverage components from said beverage-component supplies into said circulation line at said dosage section at least in part based on a measurement signal received from said measuring system, and wherein said beverage-component supplies comprise a water supply and a syrup supply.

2. The apparatus of claim 1, wherein said beverage-component supply further comprises a carbon-dioxide supply that leads into said circulation line and wherein said controller controls addition of carbon dioxide into said circulation at least in part based on said measurement signal.

3. The apparatus of claim 2, further comprising a pressure-regulating pump arranged in said circulation line downstream of said carbon-dioxide supply.

4. The apparatus of claim 1, wherein said container-filling assembly lacks a buffer tank between said beverage-component supplies and said filling tank.

5. The apparatus of claim 1, wherein said measuring system comprises a first sensor system connected to said circulation line upstream of said dosage section.

6. The apparatus of claim 5, wherein said measuring system comprises a second sensor system connected downstream of said dosage section.

7. The apparatus of claim 5, further comprising a measuring circuit that branches off said circulation line, wherein said first sensor system is arranged in said measuring circuit, wherein said measuring circuit includes first and second measuring sensor systems and a measuring-circuit pump that causes a constant volumetric-flow rate within said measuring circuit, said constant volumetric-flow rate being independent of a volumetric flow rate in said circulation line, wherein said measuring circuit continuously monitors composition of said beverage.

8. The apparatus of claim 1, wherein said measuring system comprises a sensor system arranged in said filling tank.

9. The apparatus of claim 1, further comprising an output-level pump arranged in said circulation line, wherein said output-level pump delivers beverage from an inlet to an outlet of said circulation line, both of which lead into the filling tank, wherein, during operation, said output-level pump regulates delivery rate of said beverage.

10. The apparatus of claim 9, wherein said controller is configured to control said output-level pump at least in part based on said measurement signal, which is used by said controller for controlling addition of said beverage components from said beverage-component supplies into said circulation line at said dosage section.

11. The apparatus of claim 1, wherein at least one of said beverage-component supplies comprises a regulator, wherein said regulator comprises a regulated pump and a regulating valve, and wherein the regulator is controlled based at least in part on said measurement signal, which is used by said controller for controlling addition of said beverage components from said beverage-component supplies into said circulation line at said dosage section.

12. The apparatus of claim 1, wherein said controller controls flow from said filling tank to said filling elements based at least in part on said measurement signal from said measuring system.

13. The apparatus of claim 1, wherein said container-filling machine is a rotary filling-machine and wherein said filing tank defines an annular space around an axis of said rotary filling-machine.

14. A method comprising filling containers in a container-filling assembly, said method comprising causing beverage components to be supplied into a circulation line according to a given mixing ratio until a given fill level of a filling tank is achieved, wherein supplying said beverage components comprises supplying beverage from said filling tank to a sensor system via a circulation line, based at least in part on a signal from said sensor system, continuously comparing a composition of said beverage with a reference composition, upon detecting a deviation from said reference composition, causing at least one of said beverage-component supplies to add a beverage component to said circulation line to reduce said deviation, and causing containers to be filled when a level of beverage in said filling tank has reached a desired value and a composition of said beverage is within a desired threshold of said reference composition.

15. The method of claim 14, further comprising filling said containers without using a mixer with a buffer tank between said beverage-component supplies and the filling tank.

16. The method of claim 14, further comprising using said filling tank for mixing said beverage components, thereby avoiding the need for a separate mixer with a separate buffer tank between said beverage-component supplies and the filling tank.

17. The method of claim 14, further comprising using an output-level pump arranged in said circulation line to circulate beverage through said circulation line, wherein said output-level pump delivers beverage from an inlet to an outlet of said circulation line, both of which lead into the filling tank, wherein, during operation, said output-level pump regulates delivery rate of said beverage.

18. The apparatus of claim 1, wherein said measuring system continuously provides information indicative of a composition of said beverage.

19. The apparatus of claim 2, wherein said carbon-dioxide supply comprises a carbon-dioxide source and a pressure-regulating valve that regulates flow of carbon dioxide into said circulation line and wherein said carbon-dioxide supply connects to said circulation line downstream of an output-level pump.

20. The method of claim 14, further comprising diluting said beverage in said filling tank with residual water that has been left in said filling tank as a result of condensation or a previous purging operation and adding a beverage component to compensate for said dilution of said beverage.

* * * * *